A. O. RUTZ.
POWER TRANSMISSION BELT.
APPLICATION FILED OCT. 7, 1918.

1,427,856.

Patented Sept. 5, 1922.

Inventor
Arnold O. Rutz
By Brown Hanson Bolton
Attorneys

Patented Sept. 5, 1922.

1,427,856

UNITED STATES PATENT OFFICE.

ARNOLD O. RUTZ, OF MILWAUKEE, WISCONSIN, ASSIGNOR TO MILWAUKEE GAS SPECIALTY COMPANY, OF MILWAUKEE, WISCONSIN, A CORPORATION OF WISCONSIN.

POWER-TRANSMISSION BELT.

Application filed October 7, 1918. Serial No. 257,092.

*To all whom it may concern:*

Be it known that I, ARNOLD O. RUTZ, a citizen of the United States, residing at Milwaukee, in the county of Milwaukee and State of Wisconsin, have invented a certain new and useful Improvement in Power-Transmission Belts, of which the following is a full, clear, concise, and exact description, reference being had to the accompanying drawings, forming a part of this specification.

My invention relates to improvements in belts and has to do particularly with an improved power transmission belt, the body of which is made principally of leather or similar material.

This present invention is an improvement upon the belt which forms the subject-matter of my copending application filed June 29th, 1918, Serial No. 240,987. In said application I have described and claimed a power transmission belt made up of strips of leather or the like arranged transversely of the belt and secured and held together by a plurality of coiled tension springs which extend longitudinally through the belt and have their respective ends fastened together by various forms of devices which are frictionally engaged with the ends of the springs.

In the present invention I eliminate all connections of the sort disclosed in said application and I form the springs themselves for engagement with the transverse connecting rods or pins.

Among the several advantages of my improvement are as stated, the elimination of the more or less expensive connectors, the ease with which the belt can be connected at any point in its length, the narrow space lengthwise of the belt which is occupied by the spring connector, thus making the belt substantially continuous, and the low cost of the means for connecting the ends of the springs.

To accomplish all of the above I simply form several of the contiguous end coils of each spring to stand at a right angle to the length of the belt, thus forming an eye or loop upon the end of the spring. I then thread a rod or pin through the several loops of the springs which project from the two ends of the belt, which I wish to join together, and secure this pin against removal.

Preferably I make the pin of leather, such as rawhide lacing or the like, and the act of cutting the ends of the pin used serves to spread out the pin at the ends wide enough to prevent its easy withdrawal from the spring loops.

This form of belt connecting device lends itself to the quick and easy production of a belt of any desired length as several pieces of belt can be quickly joined together if necessary, or a single piece can readily be cut at any point and its ends quickly prepared for connection.

My invention will be more readily understood by reference to the accompanying drawings in which—

Figure 1:
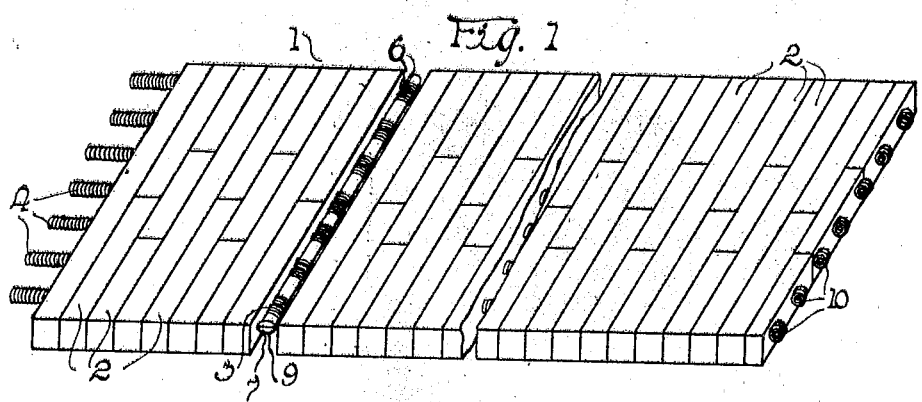
Figure 1 is a fragmentary perspective view of a belt made in accordance with my invention.

I preferably make up my improved belt of a plurality of narrow strips 1 of leather or like material. In fact, practically I make use of scrap pieces of belting leather in the manufacture of my belt. Each strip 1 may consist of a single piece of a length equal to the width of the belt or of two or more pieces 2, arranged end to end and extending across the belt. I sometimes purposely use strips made up of the shorter pieces 2, breaking joints on contiguous strips 1 for the purpose of providing a belt which is best adapted to conform to crowned pulleys in an obvious manner.

To connect the several transverse strips 1 into a belt, I prepare the several strips by providing them with a plurality of registering holes 3, spacing the holes evenly across the belt. Such holes form conduits through which I then pass or thread coiled springs 4. The springs 4 extend through the belt from end to end and are of a size to thread readily through the holes 3.

I form the springs 4 with their coils 5 in close contact, as shown, so that they will be definitely limited in contraction and adapted to be placed under tension immediately the coils begin to separate.

It should be understood that the springs themselves stand the pulling strain of power transmission, the strips, forming the belt contacting and wearing parts. I therefore proportion the number of springs, their diameter and the diameter of the wire of which they are made, to the pull to which the belt is subjected. In use the friction of the springs in the leather strips serves to distribute the strain longitudinally along the springs and prevents a destructive concentration of the strain.

Having formed my belt of strips 1 and springs 4, passed or threaded therethrough, I prepare the ends of the springs for joining the ends of the belt together by bending several coils, preferably three or four, at the end of each spring around to a position where their common axis lies substantially at a right angle to the axis of the body of the spring. In some instances one coil thus bent would be sufficient and in others possibly more than four coils would be preferable. These bent coils form a loop or eye 6 on the end of each spring, the loops or eyes being readily aligned across the end of the belt for the reception of a pin or rod 7 for joining the two ends of the belt together.

Figure 2:
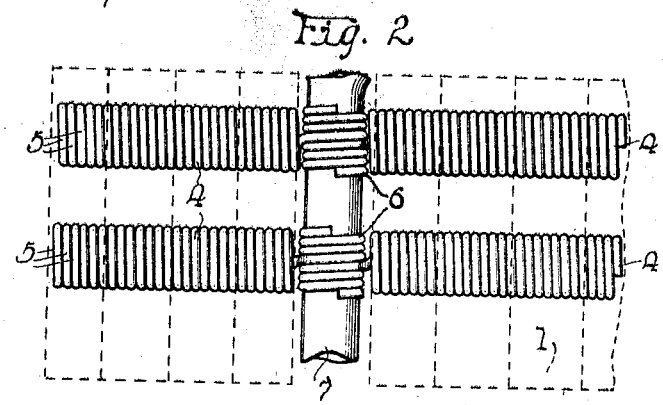
Figure 2 is an enlarged plan view of the tension springs showing the method of connecting their ends, the belt strips being indicated in dotted lines.
Figure 3:
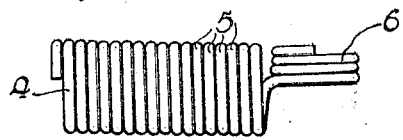
Figure 3 is an enlarged plan view of one of the spring ends.
Figure 4:
Figure 4 is a plan view of one of the connecting pins or rods.

As shown in Figures 1 and 2, I preferably arranged the loops 6 of the two ends of the belt right and left so that the springs 4 can be aligned without the loops 6 interfering with each other.

Figure 5:
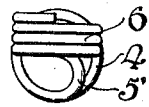
Figure 5 is an end view of one of the springs, particularly disclosing the bent spring ends.

As best disclosed in Figure 5, in forming the end of the spring to provide the connector loop 6 I preferably bend the distorted coil in a sharp bend as shown at 5' to bring the bent portion of the coil substantially to the center of the coil so that the end loops 6 of adjacent springs, when aligned, will lie in close contact with each. This form of the loop 6 prevents any bending of the connector 7 between the loops of aligned springs 4 and also prevents any lateral displacement of the end of the belt.

In making an endless belt for use on a pair of pulleys I preferably cut the springs 4 so that they are normally shorter than the belt and before joining their ends together stretch them out to the length of the belt so that they have a preliminary tension substantially sufficient to stand the normal belt strain without being unduly lengthened.

I preferably make the connecting rods or pins 7 of a diameter to just easily slide through the loops 6 and while they may be made of any material sufficiently strong to withstand the shearing strain, I prefer to use leather such as rawhide lacing or the like, for the reason that such material is self lubricating, the coils imbed themselves just sufficient to prevent any relative movement of the coils and connectors, and the ends 8 of the pins are readily spread out as shown to prevent the easy removal of the connector from its operative position. In fact the act of cutting the pin to the required length with ordinary cutting pliers serves to thus flatten or spread the ends of the connector.

The space 9 between the opposed ends of the belt is determined by the diameter of the loops 6 and hence is reduced to a practical minimum.

I usually prepare the belt in stock pieces which are as long as can be conveniently handled, the several springs having their end coils bent over as shown at 10 in Figure 1, which hold the strips 1 in place. When a definite length of belt is required for use I cut from the stock piece the length desired, spreading the strips 1 at the proper place to permit the cutting of the springs 4. I temporarily retain the ends of the springs 4 from being drawn back into the belt and form the loops 6 upon their ends, thus permanently preventing their withdrawal and preparing them for the connectors. If it is found in use that the belt stretches too much, the tension members can readily be placed under a greater initial tension by stretching them out and forming new loops on their ends.

As many modifications of my invention will readily suggest themselves to one skilled in the art I do not limit or confine my invention to the specific structures herein shown and described except within the spirit and scope of the appended claims.

I claim:

1. A belt having coiled tension springs extending through the belt from end to end, and means for joining opposed ends of the belt together, comprising bent over coils on the ends of the springs and a connector of pliable material threaded through said bent over ends.

2. A belt having coil tension springs extending through the belt from end to end, the end coils of the springs at each end thereof bent over at right angles to form loops, and a rodlike connector threaded through said loops to connect the two ends of the belt together, the ends of the connector formed to prevent its easy removal from the coil.

3. A belt having adjacent ends to be connected, said adjacent ends being spaced apart, coiled springs carried by the belt and projecting oppositely from each of the adjacent ends of the belt into the space between said ends and a unitary connector arranged transversely in said space and co-operating directly with the opposite projecting ends of said coiled springs to connect the adjacent ends of the belt together.

4. In a belt of the character described, a plurality of transversely extending separate strips, a plurality of coiled spring tension members extending longitudinally through the belt, the end coils of said spring tension members being bent over to lie substantially at right angles thereto to form connector receiving loops, the loops of opposed spring ends being offset to permit the alignment of the spring tension members, and a transversely arranged connector extending through and co-operating directly with the connector receiving loops at the opposed ends of the coiled spring tension members to connect the ends of said spring tension members.

In witness whereof, I hereunto subscribe my name this 17th day of September, A. D. 1918.

ARNOLD O. RUTZ.